United States Patent
Skaarsjoe et al.

(10) Patent No.: US 11,371,300 B2
(45) Date of Patent: Jun. 28, 2022

(54) RISER TOOLS AND METHODS

(71) Applicant: MHWIRTH DO BRASIL EQUIPAMENTOS LTDA., RJ (BR)

(72) Inventors: David Skaarsjoe, RJ (BR); Wagner Mardegan Sardenberg, RJ (BR); John Magne Johnsen, Stabekk (NO)

(73) Assignee: MHWIRTH DO BRASIL EQUIPAMENTOS LTDA., Macae (BR)

( * ) Notice: Subject to any disclaimer, the term of this patent is extended or adjusted under 35 U.S.C. 154(b) by 0 days.

(21) Appl. No.: 17/298,675

(22) PCT Filed: Dec. 2, 2019

(86) PCT No.: PCT/NO2019/050265
§ 371 (c)(1),
(2) Date: Jun. 1, 2021

(87) PCT Pub. No.: WO2020/117067
PCT Pub. Date: Jun. 11, 2020

(65) Prior Publication Data
US 2021/0355766 A1 Nov. 18, 2021

(30) Foreign Application Priority Data
Dec. 3, 2018 (GB) ..................... 1819670

(51) Int. Cl.
*E21B 19/16* (2006.01)
*E21B 17/08* (2006.01)
*B25B 23/145* (2006.01)

(52) U.S. Cl.
CPC .......... *E21B 19/166* (2013.01); *E21B 17/085* (2013.01); *E21B 19/16* (2013.01); *E21B 19/165* (2013.01); *B25B 23/1456* (2013.01)

(58) Field of Classification Search
CPC ........ E21B 17/01; E21B 17/085; E21B 19/16; E21B 19/165; E21B 19/166
See application file for complete search history.

(56) References Cited

U.S. PATENT DOCUMENTS 3,920,082 A 11/1975 Dudek
3,969,810 A 7/1976 Pagano
(Continued)

FOREIGN PATENT DOCUMENTS

GB 2464778 A 5/2010
KR 10-1349069 B1 1/2014
WO WO 2010/049891 A2 5/2010

*Primary Examiner* — Tara Schimpf
(74) *Attorney, Agent, or Firm* — Norman B. Thot

(57) ABSTRACT

Torque tool (200) configured for making up and breaking out joints (1a, 1b) in a riser (100), the tool (200) comprising: a tool body (3) and a tool head (4), the tool head (4) having a socket (4') configured to receive a head (14) of a bolt (2) and apply a torque on the bolt (2), a torque sensor (20) operable to measure the torque applied on the bolt (2), and a pre-tension sensor (21) operable to measure a pre-tension in the longitudinal extension of the bolt (2) when the bolt (2) is received in the tool head (4). There is also provided a method for pre-tensioning bolted riser joints (1a, 1b) comprising a plurality of bolts (2), a method of managing a plurality of bolts (2) for riser joints (1a, 1b), a method of managing a plurality of bolts (2) for riser joints (1a, 1b), and a riser connector (101).

20 Claims, 5 Drawing Sheets

(56) References Cited

U.S. PATENT DOCUMENTS

| | | | |
|---|---|---|---|
| 4,093,281 A | | 6/1978 | Jansen, Jr. |
| 4,676,109 A | | 6/1987 | Wallace |
| 4,899,591 A | * | 2/1990 | Kibblewhite ....... B25B 23/1425 |
| | | | 29/594 |
| 6,167,764 B1 | * | 1/2001 | Calhoun ............... B23P 19/067 |
| | | | 73/837 |
| 6,351,997 B1 | * | 3/2002 | Loffler ................... F16B 31/02 |
| | | | 73/761 |
| 7,021,180 B2 | * | 4/2006 | Crane ................... B25B 21/004 |
| | | | 81/467 |
| 2002/0005092 A1 | | 1/2002 | Collins et al. |
| 2014/0209322 A1 | | 7/2014 | Francis et al. |
| 2014/0224546 A1 | | 8/2014 | Boulet |
| 2016/0229037 A1 | | 8/2016 | Quigley |
| 2016/0258562 A1 | | 9/2016 | Bjoerneklett et al. |

* cited by examiner

RISER TOOLS AND METHODS

CROSS REFERENCE TO PRIOR APPLICATIONS

This application is a U.S. National Phase application under 35 U.S.C. § 371 of International Application No. PCT/NO2019/050265, filed on Dec. 2, 2019 and which claims benefit to Great Britain Patent Application No. 1819670.9, filed on Dec. 3, 2018. The International Application was published in English on Jun. 11, 2020 as WO 2020/117067 A1 under PCT Article 21(2).

FIELD

The present invention relates to tools and methods for operation of risers in the marine environment. In one embodiment, there is provided tools and methods suitable for reducing uncertainty of bolt pre-tension and a system for improved riser bolting. Other embodiments relates to riser connectors and methods relating to riser connectors and/or riser bolting.

BACKGROUND

Risers are conduits that provide a temporary extension of a subsea oil well to a surface facility, for example, for drilling, intervention work or production. There are several types of risers that are commonly utilized in petroleum operations. One type of riser is a marine drilling riser where a subsea blowout preventer is used and generally deployed from floating drilling vessels. Another riser type is a tie-back drilling riser where a surface blowout preventer is utilized and generally deployed from fixed platforms. WO 2015/071411 A2 describes, generally, the use of a riser in an offshore drilling operation. See FIG. 1 of WO 2015/071411 A2 and the associated description.

Common to most such risers are that they are made up of sections which are connected together in an end-flange to end-flange fashion. These connections are then in the primary load path while running, operating, and retrieving the riser; their structural integrity is therefore essential. Several failures have been recorded for such submerged connections in the past which has resulted in stringent requirements with regards to mechanical integrity and safety factors.

Bolted connections are well known for providing reliable connections while still being simple to dismantle. It is nevertheless known that threaded bolts can loosen unintentionally, deform and change shape. Such failure of critical bolts can have detrimental consequences in terms of safety as well as costly operational downtime. Due to vibrations and dynamic loads, any movements between the clamped parts may influence the bolted joints. Bolted joints typically have a functional pre-tension range in which the joint is safe. Yielding may occur if the pre-tension is too high. If the pre-tension is insufficient, there may be a separation or sliding between the parts resulting in possible bolt fatigue and self-loosening issues.

SUMMARY

An aspect of the present invention to provide a device and a method for improved riser bolting.

In an embodiment, the present invention provides a torque tool configured for making up and breaking out joints in a riser, the tool comprising: a tool body and a tool head, the tool head having a socket configured to receive a head of a bolt and apply a torque on the bolt, a torque sensor operable to measure the torque applied on the bolt, and a pre-tension sensor operable to measure a pre-tension in the longitudinal extension of the bolt when the bolt is received in the tool head.

In an embodiment, the present invention provides a method for pre-tensioning bolted riser joints comprising a plurality of bolts, the method comprising: operating a torque tool to engage a head of a bolt, operating the torque tool to apply a make-up torque to the bolt while measuring the torque applied with the torque sensor and the pre-tension of the bolt with the pre-tension sensor, continue applying torque with the torque tool until the measured torque lies within a pre-determined range of prescribed torque values and the pre-tension lies within a pre-determined range of prescribed pre-tension values.

In an embodiment, the present invention provides a method of managing a plurality of bolts for riser joints, the method comprising: (a) operating a torque tool to fasten each of the plurality of bolts while measuring a torque applied on the bolt and a resulting pre-tension of the bolt, (b) calculating a performance indicator parameter, the performance indicator parameter being a function of the measured make-up torque and the measured pre-tension of the bolt and indicative of a coefficient of friction between the bolt and the riser, (c) comparing the performance indicator parameter to one or more pre-defined ranges, and (d) replacing the bolt if the performance indicator parameter lies outside the one or more pre-defined ranges.

In an embodiment, the present invention provides a method of managing a plurality of bolts for riser joints, the method comprising: during deployment of a riser, operating a torque tool to: identify a bolt, the bolt being one of the plurality of bolts, apply a make-up torque to the bolt, measure a first pre-tension value for the bolt with the pre-tension sensor, store the measured pre-tension in a database, and during retrieval of the riser: identify the bolt, measure a second pre-tension value for the bolt with the pre-tension sensor, output a performance indicator value to an operator, the performance indicator value comprising the first and second pre-tension values and/or a comparison between the first and second pre-tension values.

In an embodiment, the present invention provides a riser connector comprising a pair of flanges, a plurality of bolts connecting the flanges, the bolts arranged about a longitudinal central axis of the riser connector, each bolt having a head, a shank and a thread, and wherein the shank has a non-cylindrical shape.

Further advantageous embodiments are outlined in the following detailed description, with reference to the appended figures.

BRIEF DESCRIPTION OF THE DRAWINGS

The above and other characteristics will become clear from the following description of embodiments, given as non-restrictive examples, with reference to the attached schematic figures, in which.

DETAILED DESCRIPTION

Figure 1:
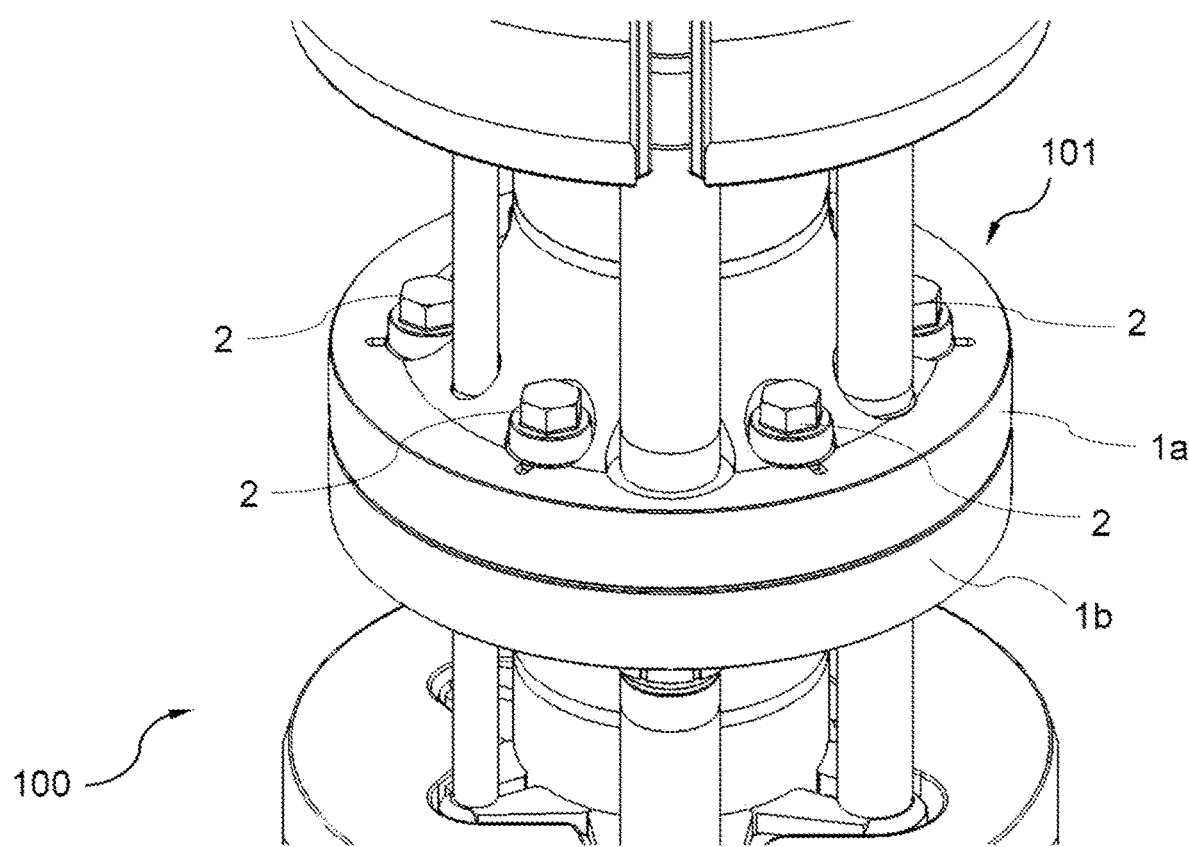
FIG. 1 shows a perspective view of riser joints.

FIG. 1 shows a part of a riser 100 comprising riser joints 1a and 1b which are connected by multiple threaded fasteners, here shown as bolts 2. Such clamped connections will be made up between pairs of riser sections as the riser is installed.

Figure 2:
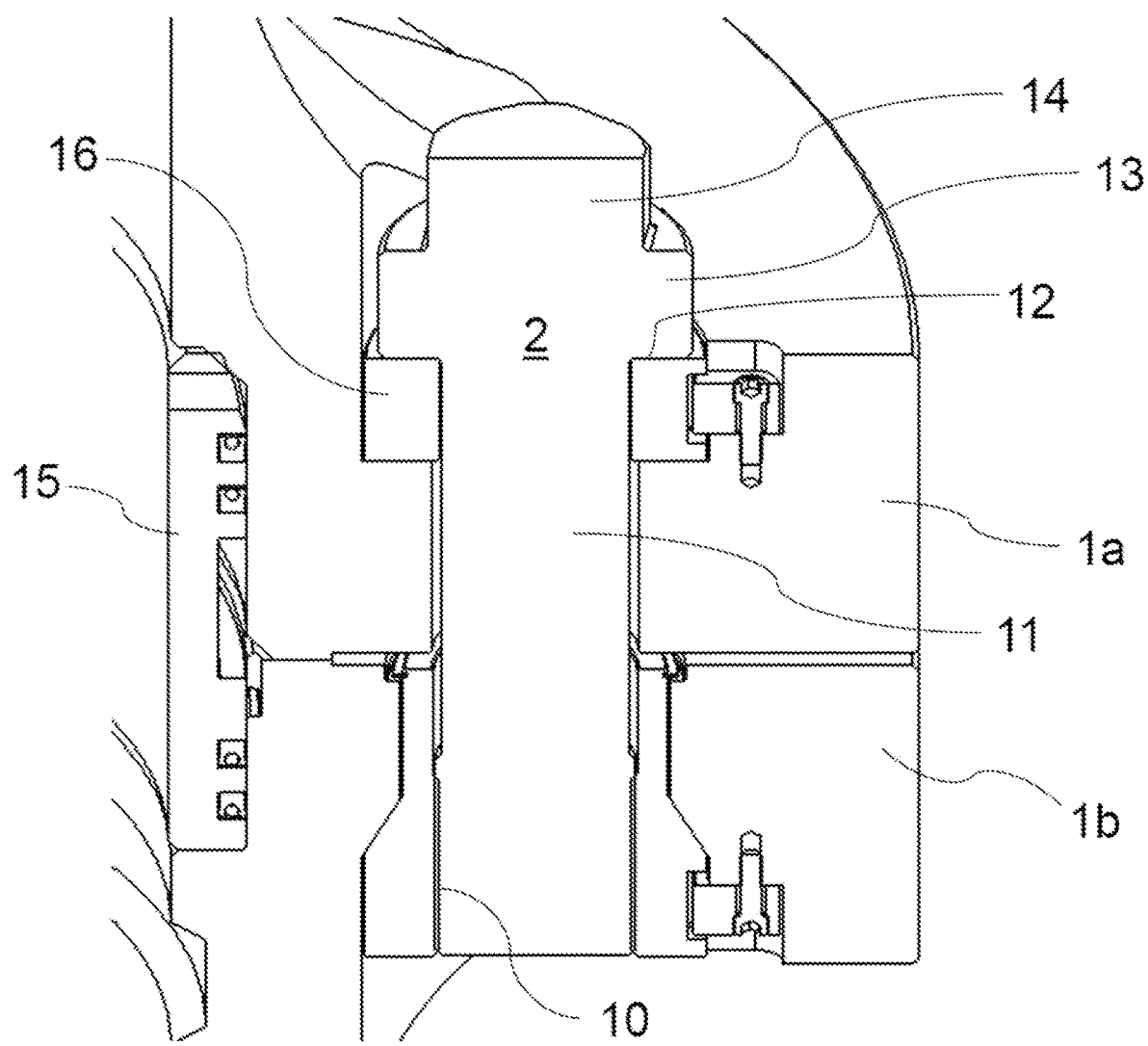
FIG. 2 shows a cross section of a riser joint connection.

FIG. 2 shows a cross section of a part of FIG. 1. The threaded fasteners are bolts 2 as shown in FIG. 2, in this embodiment having a thread 10, shank 11, bearing surface 12, shoulder 13 and a head 14. The connection further comprises a seal sleeve 15 arranged between the joints 1a and 1b. The general arrangement of FIGS. 1 and 2 will be familiar to a person skilled in the art as a conventional, bolted riser connection.

A challenge when making up such threaded connections is that there will be friction between the different components, such as between the engaging surface of the bolt head 14 or the shoulder 13 and the body of the joint 1a (in this case, between a lower surface of the shoulder 13 and a bearing element 16 arranged in the joint 1a) and in the threaded connection. The coefficients of friction can be difficult to accurately predict, and these are also likely to change over time and operational cycles due, for example, to corrosion, coating loss, lubrication loss, local plastic deformation, wear, etc. Applying a given make-up torque to the bolt 2 may therefore give different levels of pre-tension in the bolt 2, depending on operational circumstances and external factors.

Figure 3:
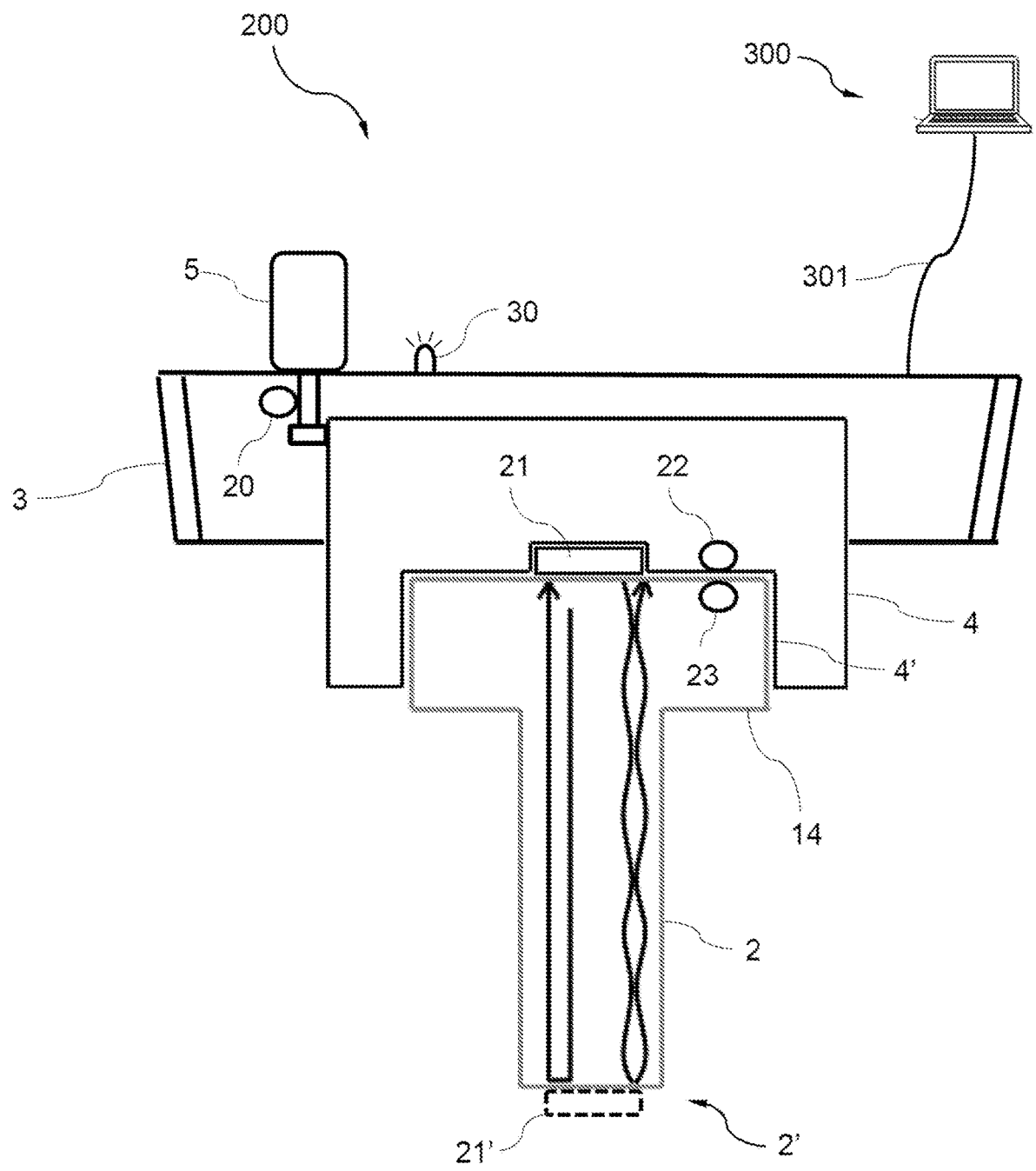
FIG. 3 shows a torque tool according to an embodiment.

FIG. 3 shows a schematic illustration of a riser torque tool 200 comprising a tool body 3 and a tool head 4 configured to engage the bolt head 14. The torque tool 200 is operable to tighten or loosen the bolt 2 by means of torque applied via the tool head 4. Torque can be applied between the tool body 3 and the tool head 4, for example, via a hydraulic motor 5, which is illustrated only schematically in FIG. 3. It should be appreciated that the different elements shown in FIG. 3 are not drawn to scale or with correct relative sizes, but are only shown illustratively for best possible clarity.

A torque sensor 20 is operable to measure the torque applied to the bolt 2. The torque sensor 20 may be a sensor which measures the applied torque directly, such as a load cell, or an indirect measurement, for example, by measuring the hydraulic pressure applied and calculating the resulting torque based on the fluid pressure and a known correlation between this pressure and the torque, as determined by the design characteristics of the riser torque tool 200. If the torque sensor 20 measures the torque directly, it may, for example, operate between the tool body 3 and the tool head 4, i.e., measuring the torque applied on the tool head 4, it may measure the torque applied between the tool head 4 and the bolt head 14, or it may be arranged elsewhere, for example, on a support arm of the riser torque tool 200, to measure the applied torque.

The riser torque tool 200 may be a hand-held tool, a partially hand-held/hand-operated tool (such as a tool provided on a movable, passive support arm), or a remotely operable tool (such as a tool provided on an active support arm).

By means of the riser torque tool 200, a plurality of bolts 2 can be made up (or broken out) during riser operations. The torque applied to each bolt 2 during making up can be measured and controlled so that the applied torque is within a pre-determined range in order to provide sufficient torque for a secure connection, but to avoid applying too high torque, which may reduce the integrity of the connection and adversely impact the lifetime of the bolt 2.

At least one elongation sensor 21 may be incorporated in the tool head 4. In this embodiment, the elongation sensor 21 is arranged in a socket 4' of the tool 200, the socket 4' being arranged to receive the bolt head 14 of the bolt 2. The elongation sensor 21 may be an acoustic transducer configured to measure the elongation of the bolt 2. The elongation sensor 21 may, for example, be a piezoelectric or an electromagnetic acoustic transducer, to measure the elongation of the bolt 2 by acoustic wave propagation. As the actual elongation of the bolt 2 is an indicator of the actual pre-tension applied, the riser torque tool 200 may thus be operated to measure the pre-tension of the bolt 2 at specific points in time or continuously during make-up or break-out. The elongation sensor 21 may alternatively be arranged for temporarily mounting on a bottom end 2' of the bolt 2, illustrated by the dashed elongation sensor 21' shown in FIG. 3. In this embodiment, the elongation sensor 21' may be attached to the bolt 2 prior to energizing the torque tool 200, so as to provide elongation measurements similarly as described above. Each bolt 2 may alternatively incorporate a sensor in its design.

Further details on the operation of the elongation sensor 21 will be described below.

A different type of pre-tension sensor may alternatively be used. For example, another method to measure the stress in the bolt by using two types of ultrasonic transducers and to measure the difference between the signals. Other types of sensors may also be available. The pre-tension sensor may thus refer to several different ways to measure the tension ("stretch") in the bolt at the end of a make-up process or at the beginning of a break-out process.

An identification sensor 22 can be arranged on or in conjunction with the tool 200. The identification sensor 22 can, as in the embodiment shown in FIG. 3, be arranged in the socket 4' like the elongation sensor 21, or it can be arranged in a different position on or by the tool 200. The identification sensor 22 may, for example, be a hand-held unit connected to the tool 200, such as a hand-held scanner.

The identification sensor 22 is arranged to read a tag 23 arranged on the bolt 2. In this embodiment, the tag 23 is an RFID tag incorporated in, or otherwise arranged on, the bolt 2, and the identification sensor 22 is an RFID reader. The tag 23 can alternatively be a different type of wireless signal transmitter, or a different type of identifier, such as a QR code, the identification sensor 22 being a visual sensor operable to read the code. The operation of the identification sensor 22 will be further described below. The identification of each bolt may alternatively be performed through automated length measurements using the elongation sensor incorporated in the tool. If each bolt is manufactured with a specific length, and this length is identifiable and can clearly be distinguished, this data may be used in a database to positively identify the bolts.

The riser torque tool 200 may be connected to a computing system 300 via a signal transmission line 301. The signal transmission line 301 may be a cable, as illustrated, or it may be a wireless transmission link, e.g., Bluetooth or WLAN. The riser torque tool 200 and the computing system 300 are configured so that the computing system 300 obtains the signals from one or more of the sensors 20, 21 and 22. In the illustrated embodiment, the computing system 300 is external to the riser torque tool 200 and connected via signal transmission line 301, however, the computing system 300 may alternatively be provided on (for example, fixed to) the riser torque tool 200 or integrated within the riser torque tool

200. The computing system 300 can, for example, comprise a microcontroller which is operable to process the sensor signals and (if applicable) analyze them and provide relevant outputs (see some examples described below), and a data storage (such as a hard drive comprising a database) for storing historical values of the sensor signals and, if applicable, other operational variables such as time, rig location, well information, identity of the riser joints, etc.

The riser torque tool 200 may further comprises an output device 30 operable to provide an output signal to an operator of the riser torque tool 200. The output signal may, for example, be an audible signal or a visual signal. In one embodiment, the output signal is a light arranged on the riser torque tool 200 or in the vicinity of the riser torque tool 200 so as to be visible for the operator. The output device 30 may be connected to the computing system 300, whereby the output from the output device 30 is controlled by the computing system 300 based on readings from one or more of the sensors 20, 21, 22. This can provide operator assistance as described in further detail below.

As will be clear from the above description, the riser torque tool 200 may be used to make up or break out bolted connections during deployment or retrieval of a marine riser of any type, such as a drilling riser. An operator may place the riser torque tool 200 on the bolt 2 to be fastened or released, and operate the riser torque tool 2 to provide the required torque. The plurality of bolts 2 in a given connection between two riser joints 1a, 1b may be handled sequentially by the operator.

In use, the output device 30 can give the operator direct feedback, for example, during make up (clamping). This allows for a more accurate pre-tensioning during tightening of the bolt 2 to the point where it is fully tightened, but not so much as to stretch it into the plastic deformation (permanent deformation) or that the material utilization in the parts is unfavourably high for the application. Before make-up of the riser joints, the length of each bolt 2 may be measured and logged in a database. During make-up operation, the riser torque tool 200 may be set to a pre-defined target torque value and/or a pre-defined target pre-tension/elongation for the type of bolt 2 that is utilized. The bolts 2 change shape (i.e., they are elongated) as the riser joints are tightened and clamping force is induced. If the elongation sensor 21 is an ultrasound sensor, this leads to increased time delay of the acoustic wave. When the riser torque tool 200 reaches the predefined time delay of the acoustic wave, the correct pre-tension of the bolts 2 is then achieved, and the torque can be relaxed and the next bolt 2 can be made up.

If a different type of pre-tension sensor is used, a target pre-tension value may similarly be set and the bolts 2 made up to reach the desired pre-tension.

The riser torque tool 200 may comprise a light system provided by the output device 30 which gives the operator a visual direct feedback while making up the riser joints. For example, a green light can be shown when correct pre-tension is achieved with acceptable torque and/or the pre-defined acoustic wave time delay, a yellow light when the applied torque values required to reach defined pre-tension or the predefined acoustic wave time delay is close to maximum, and a red light when the pre-tension values or the predefined acoustic wave time delay are not met at maximum torque or the torque required to meet them is too high.

In an embodiment, the riser torque tool 200 enables collection of data regarding which make up torque is required to reach certain pre-tension values. This may be used to calculate the coefficient of friction in each connection and by that define limits which will trigger inspection, repair or replacement of a bolt 2. The collected data may, additionally or alternatively, be used for trending/analysis of the joint connection and/or threaded fasteners condition which may trigger intervention such as parts replacement. After operation, when the bolt connection is released, the stored make up pre-tension value may be compared with the pre-tension before the bolt is broken out and any loss of pre-tension can be registered and stored in a database. This function can register creep or other forms of relaxation in each bolt and provide important information as to whether the bolt had the correct tension during operation. In case a bolt has lost too much tension during operation, the connection may have experienced separation between the flanges and/or the bolts may have been subject to unfavorable varying loads which may lead to increased fatigue wear. Bolts identified as being operated with too low tension may therefore be sorted out for detailed inspection for cracks and other forms of defects.

A large number of bolts 2 are used when assembling and deploying a riser. The identification sensor 22 may be configured to read a unique identification tag 23 from the bolt 2 which at any time is being handled, and to supply this information to the computing system 300. The riser torque tool 200 may thus be configured to enable digitalized traceability of each bolt 2 used to make up the riser via the unique tags 23 on each of the bolts 2. The unique electronic signature for each bolt 2 may be stored in a database in the computing system 300 and thereby be identified when operating the torque tool 200 on the respective bolt 2. The tags 23 and the computing system 300 may be configured to enable tracking on usage and the required torque values to reach a correct pre-tension (which may be also used to calculate coefficient of friction, which may be used for condition evaluation).

The data may be logged in the database, as can performance parameters calculated on the basis of the logged sensor data. The computing system 300 may optionally also be utilized to visualize parameters for monitoring and analysis of the condition of each bolt 2. Based on the data gathered, the operator may suggest inspections, replacements and/or need for repair. The data may be acquired during make up of the riser joints and/or during break out of the riser joints. The tags 23 may be of the radio-frequency identification (RFID) type, which uses electromagnetic fields to automatically identify and track tags 23 attached to respective bolts 2. The tags 23 may be of a short range type so that only one bolt 2 at a time can be in the range of the identification sensor 22 when operating the riser torque tool 200. The range of the identification sensor 22 may, for example, be shorter than a minimum distance between two of a plurality of bolts 2 on a riser joint 1a.

The tags 23 may alternatively be acoustic transducers which are able to send and receive data or may be an acoustic receiver where an acoustic signal may be sent from the riser torque tool 200 or from a remote location. In an embodiment, the bolts 2 may have a visual unique identification which may be picked up manually or captured by a camera arranged in the identification sensor 22. The camera may be integrated in the torque tool 200, but can alternatively, for example, be a hand-held unit. Visual recognition technology may be used to feed the information to the computing system 300 and into the database.

In an embodiment, each bolt 2 may be made in a unique length and by the use of the elongation sensor 21 or a separate elongation sensor for this purpose (such as a ultrasound sensor), a measurement can identify the bolt 2 by length in the relaxed state, before make up or after break out.

The identification sensor 22 may therefore in some cases be the same sensor as the elongation sensor 21.

As noted above, the riser torque tool 200 may have a computing system 300 configured to receive measurements from the torque sensor 20 and the elongation sensor 21. The output device 30 may be operatively connected to the computing system 300, and the computing system 300 configured to process the measurements, to compare a processed value of the measurements to one or more pre-defined ranges, and to output a signal to an operator of the torque tool 200 if the processed value lies within the pre-defined ranges and/or if the processed value lies outside the pre-defined ranges.

The pre-defined ranges may comprise a torque range indicative of a desired make-up torque for the bolt 2 and a bolt elongation range indicative of a desired make-up pre-tension for the bolt 2.

A method for pre-tensioning bolted riser joints having a plurality of bolts 2 may accordingly comprise: operating a torque tool 200 to engage a bolt head 14 of a bolt 2; operating the torque tool 200 to apply a make-up torque to the bolt 2 while measuring the torque applied with the torque sensor 20 and the elongation of the bolt 2 with the elongation sensor 21; and continue applying torque with the torque tool 200 until the measured torque lies within a pre-determined range of prescribed torque values and the elongation lies within a pre-determined range of prescribed elongation values.

The method may comprise outputting a signal to an operator of the torque tool 200 if the measured torque lies within the pre-determined range of prescribed torque values and the elongation lies within the pre-determined range of prescribed elongation values. The method may further comprise logging the measured torque and the measured elongation in a computing system 300.

An advantage of some embodiments of the tool and the method described here is that a higher degree of accuracy for pre-tensioning of bolts is provided, which can give a smaller variation and by that allow for less conservative riser joint make up procedures, with less over-tension required to at all times provide that the minimum pre-tension value in the connection is achieved. This can enable lower material grades of the threaded fasteners to be utilized, which are easier to make in compliance with maximum hardness requirements applied in the industry. Softer materials can in some cases be used, for example, which are generally more resistant to several failure mechanisms which may occur subsea such as, but not limited to, hydrogen induced stress corrosion cracking (HISCC).

In an embodiment, the torque tool 200 and the computing system 300 may be operable to, for a plurality of make-up operations: receive the unique identity of the tag 23 identifying the bolt 2; calculate a performance indicator parameter, the performance indicator parameter being a function of a measured make-up torque and a measured elongation of the bolt 2, and output the performance indicator parameter x to an operator. The computing system 300 can be operable to output single values of the performance indicator parameter, or a trend of the performance indicator parameter over time.

Figure 4:
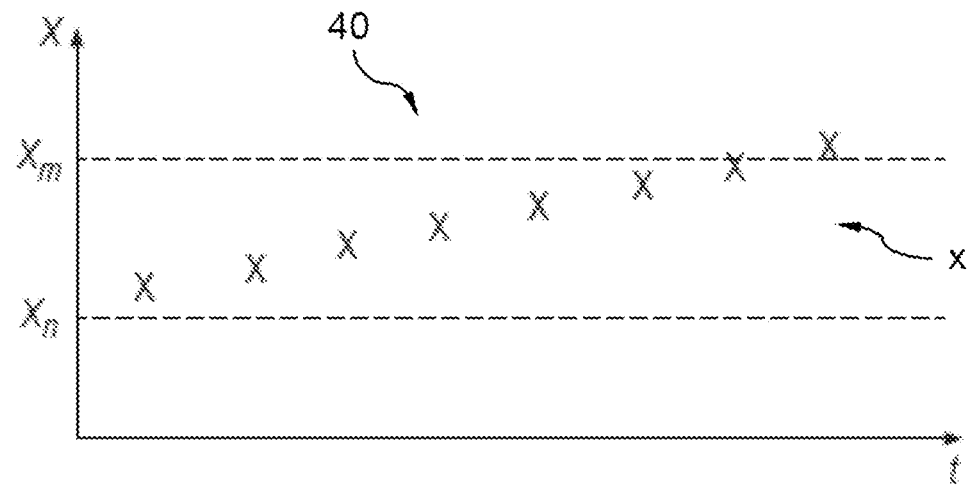
FIG. 4 illustrates a plot of a performance indicator parameter.

The latter is illustrated in FIG. 4, where a trend 40 of performance indicator parameter x values is presented on a graph against time t. The performance indicator parameter values x may, for example, be a function of the make-up torque needed to achieve a required elongation or pre-tension. Boundaries or thresholds xm,xn may be defined so as to allow an operator to replace a bolt 2 if, for example, the required pre-tension cannot be achieved within an acceptable torque range. This may be an indicator of bolt degradation or damage, and the system and method according to this embodiment thereby allows an operator to identify a deteriorating trend and/or a performance value which lies outside a pre-defined, acceptable range, such as to, for example, replace the bolt 2 if necessary.

In an embodiment, a method of managing a plurality of bolts 2 for riser joints 1a, 1b comprises:

(a) operating a torque tool 200 to fasten the bolt 2 while measuring a torque applied on the bolt 2 and a resulting elongation of the bolt 2;

(b) calculating a performance indicator parameter, the performance indicator parameter being a function of the measured make-up torque and the measured elongation of the bolt and indicative of a coefficient of friction between the bolt 2 and the riser 100;

(c) comparing the performance indicator parameter to one or more pre-defined ranges; and (d) replacing the bolt 2 if the performance indicator parameter lies outside the one or more pre-defined ranges.

The method according to this embodiment can also be illustrated by FIG. 4 where the performance indicator parameter x now being indicative of the coefficient of friction between the bolt 2 and the riser elements.

Advantageously, steps (a) to (c) can be repeated for a plurality of riser joint make-up operations, and values of the performance indicator parameter x logged for the plurality of make-up operations.

By means of the identification sensor 22, the method may comprise operating the riser torque tool 200 to receive a unique identity of a bolt 2, and outputting a trend 40 of the performance indicator parameter x for the bolt 2 having the unique identity over the plurality of make-up operations. This can then be carried out for a number of bolts 2, or all the bolts 2 used in the riser operation.

Such a material stress (elongation) vs. applied torque comparison can provide a useful measurement and may, for example, find application in a condition-based management context. By evaluating the torque required to meet a specific elongation value, one can calculate an estimated coefficient of friction over the threads and the under the head, which can provide information about the surfaces important for the connection. The coefficient of friction variable may, in a short to medium time range, change due to material degradation (corrosion, coating loss, lubrication loss, local plastic deformation, wear etc.). By calculating the performance indicator parameter indicative of a coefficient of friction and replacing the bolt 2 if the performance indicator parameter lies outside the one or more pre-defined ranges, one can achieve enhanced safety in that a bolt 2 which does not meet given integrity criteria can be replaced.

In an embodiment, there is provided a method of managing a plurality of bolts 2 which make up a pre-defined set of known bolts 2 for riser joints 1a, 1b, the method comprising:

during deployment of a riser 100, operating the riser torque tool 200 to:
identify a bolt 2, the bolt 2 being one of the plurality of bolts 2;
apply a make-up torque to the bolt 2;
measure a first pre-tension value for the bolt 2 with the elongation sensor 21; and
store the measured pre-tension in a database; and
during retrieval of the riser 100:
identify the bolt 2;

measure a second pre-tension value for the bolt 2 with the elongation 21; and output a performance indicator value to an operator, the performance indicator value comprising the first and second pre-tension values and/or a comparison between the first and second pre-tension values.

The pre-tension values may be pre-tension values measured by any given elongation sensor used, for example pre-tension values calculated on the basis of measured elongation values, or the pre-tension values may be represented by the elongation values directly.

The method may also comprise:

measuring the make-up torque with the torque sensor 20; and storing the measured make-up torque in the database, wherein the performance indicator value comprises the measured make-up torque or a function of the measured make-up torque.

The method may also comprise:

applying a break-out torque to the bolt 2; and measuring the break-out torque with the torque sensor 20, wherein the performance indicator value comprises the measured break-out torque or a function of the measured break-out torque.

In this embodiment, one can advantageously track and compare the bolt tension obtained right after making up the bolt when running the riser, to what the pretension is when the riser is retrieved out of the water (which can be after a number of months in the sea) and the bolt is broken out. This allows an operator to identify if there is, for example, creep or relaxation of the connection. If the loss of pre-tension is significant enough so that it is less than the load the connection is subject to during operation, the bolts may experience fatigue and can, for example, be replaced/inspected for cracks.

The comparison can be done for individual bolts 2, for example, by RFID tracking and use of the identification sensor 22, as described above. The computing system may store the elongation/pre-tension value when the bolt was torqued up and then compare that value with the value of the same bolt after operations.

In a second aspect of the present invention is that conventional bolts used in flanged riser connectors suffer from shortened service life and increased risk of failure due to the particular load conditions to which they are exposed in such very specific and highly demanding applications. As described above, bolts in flanged riser connectors are typically arranged in a circumferential arrangement on two interconnected flanges, about a central riser conduit. Because of the particular loads the riser connectors are exposed to during various types of operation, the integrity of the connection can be very difficult to predict. Such loads may include a combination of cyclic longitudinal loads in the riser string from drilling rig heave, sideways forces (bending and shear forces) due to waves and/or currents, riser string deflection or rig drift-off, or resonance-induced loads, for example, when running or retrieving a high weight, such as a BOP, during harsh weather. This makes it very challenging to establish overall riser integrity, and to predict a need for bolt replacement.

The present invention provides a bolt having certain advantageous and inventive features to improve bolt performance, such as service life and reliability, in riser connector applications. These advantages and features may be realized on their own, or in combination with the tools and methods described above. In an embodiment, the present invention provides a riser connector 101 comprising a pair of flanges 1a, 1b, a plurality of bolts 2 connecting the flanges 1a, 1b, the bolts 2 arranged about a longitudinal central axis of the riser connector 101, each bolt 2 having a head 51, a shank 52 and a thread 53.

The shank 52 may be convex, i.e. have a convex profile in a plane parallel to the longitudinal direction of the bolt 2, whereby a central section of the shank 52 has a largest diameter d1 which is greater than a smallest diameter d2 towards the end parts of the shank 52, i.e., the parts which interface the thread 53 and head 51. The shank 52 may have a largest diameter d1 which is larger than the minor diameter of the thread 53, or larger than the pitch diameter of the thread 53. The largest diameter d1 can, for example, be lower than or equal to the major diameter of the thread 53. This provides that the shank 52 does not restrict the bolt 2 from being employed in an opening (e.g., flange holes) dimensioned in relation to the major diameter of the thread 53. The largest diameter d1 may advantageously be lower than or equal to the minor diameter of the thread 53.

The smallest diameter d2 of the shank 52 may be lower than the major diameter of the thread 53, lower than the pitch diameter of the thread 53, or lower than the minor diameter of the thread 53.

The ratio between the smallest diameter d2 and the largest diameter d1 may be between 0.8-0.95, for example, between 0.87-0.92, or, for example, about 0.9.

In order to achieve a transition as smooth as possible between the shank 52 and the head 51 as well as between the shank 52 and the thread 53, it may be desirable to make the absolute difference between the smallest diameter d2 and the largest diameter d1 as large as possible. A larger ratio may allow for a larger transition, 54 and 55, which may provide a more favorable stress distribution. The maximum diameter of d1 may be limited by the size for the bolt to pass through its holes in the flange. The minimum diameter d2 may be limited by the effective stress area required in order to meet the strength requirements of the bolt in that cross section, which can be established for a given application via conventional simulation software. Within these constraints, it may be desirable to make the absolute difference between the smallest diameter d2 and the largest diameter d1 as large as possible.

The shape of the shank 52 may have a cylindrical section in the middle which transitions into conical sections slightly off-set and which lead to the smaller diameter d2. The shape may, for example, be parabolic or an arc of a circle or an ellipse, or, for example, the shape may be optimized with a varying cross section based on analysis of the actual load case which reflects the actual bending moment along the shank 52 in order to achieve substantially equal absolute stress in all cross sections.

The shank 52 may advantageously have a transition 54 at its end section towards the thread 53, and/or a transition 55 at its end section towards the head 51, the transition 54, 55 having a gradually increasing diameter along a longitudinal direction of the bolt 2. The transition may have a curved profile in a plane parallel to the longitudinal direction of the bolt 2. The transition may have an arcuate profile in a plane parallel to the longitudinal direction of the bolt 2.

The transition 54 and/or the transition 55 advantageously has an end diameter at the interface 57 towards the head 51 and the corresponding interface towards the thread 53 (respectively) which is equal to or less than the largest diameter d1, but larger than the smallest diameter d2. The end diameter may be equal to the largest diameter d1.

Figure 6:
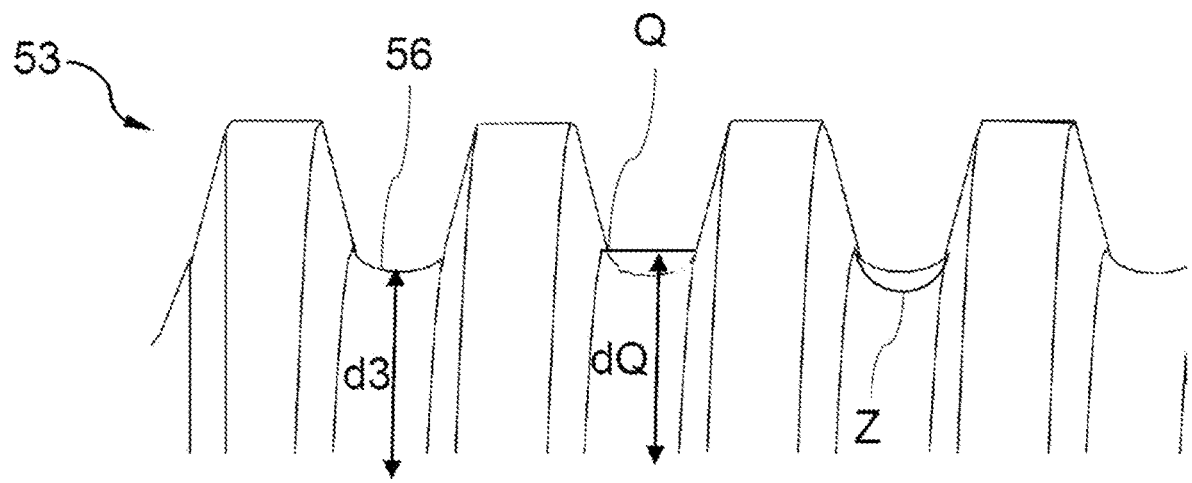
FIG. 6 illustrates parts of the bolt shown in FIG. 5.

The bolt 2 may also have a thread 53 with a thread root 56 having a curved profile in a plane parallel to the longitudinal direction of the bolt 2. This is illustrated in FIG. 6. The thread root 56 may have an arcuate profile in a plane parallel to the longitudinal direction of the bolt 2.

A conventional thread used in this type of application has a flat root, which results in sharp transitions Q between the thread flank and the root with a very small radius. If the radii between the root and the flank are increased, the mating nut in the bolt connection needs to be modified in order to avoid interference. By the means of increased pre-tension control, for example, using the tools and methods described above, a slightly smaller effective stress-carrying area, d3, may be accepted for the threaded section 53. This facilitates a smaller effective stress area. In order to minimize stress area loss, d3, the thread root can, for example, be shaped as an arc of an ellipse. A circular cut in the root, Z, of the thread may be used but this may affect the stress cross section more than an arc of an ellipse.

In addition to reduced stress concentration, manufacturing and inspections of the components may become easier when avoiding sharp corners. In a life cycle service context, this may increase the probability of detection of micro cracks caused by fatigue in these areas.

The present invention provides that a bolt designed with one or more of these features has a stress distribution which is favourable in view of the particular static and dynamic loads to which a submerged riser connector is exposed. For example, while cylindrical profiles of the shank 52 and/or the thread root 56 may be optimal for bolts subjected predominantly to pure strain stress, for bolts exposed to the particular conditions in riser connectors, including e.g., bending stress and various cyclic loads, embodiments as described herein provide improved performance. It was surprisingly established that the convex shank will not affect the bolt's capacity to resist a bending moment, but that it will, however, leave room for a smoother transition between the shank 52 and the head 51 as well as between the shank 52 and the thread 53, providing a more favourable stress distribution.

Figure 5:
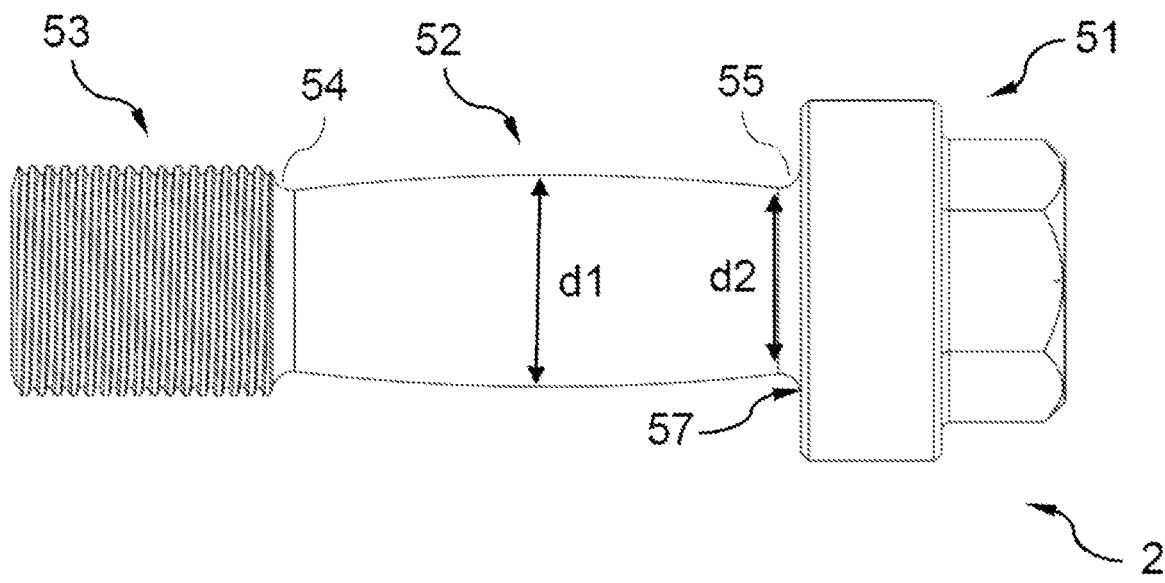
FIG. 5 illustrates a bolt which is part of one embodiment.

Particularly advantageous may be the use of methods as described above together with a bolt 2 having one or more of the features described in relation to FIGS. 5 and 6.

According to embodiments described herein, it may, for example, be possible to obtain improved information about bolt condition, performance, and/or expected remaining service life. Certain embodiments may allow the use of a softer material in the bolt, due to improvements in monitoring and/or bolt design, which can provide advantages of reduced risk of hydrogen-induced cracking, and thus lower the risk of failure of the riser connector.

While the present invention has been described with reference to the embodiment(s) mentioned above, it is to be understood that modifications and variations can be made without departing from the scope of the present invention, and such modifications and variations shall remain within the field and scope of the invention. Reference should be had to the appended claims.

LIST OF REFERENCE NUMERALS

100 Riser
101 Riser connecter
200 Riser torque tool
300 Computing system
301 Signal transmission line
1a, 1b Riser joints/Flanges
2 Bolt
2' Bottom end (of bolt)
3 Tool body
4 Tool head
4' Socket
5 Hydraulic motor
10 Thread
11 Shank
12 Bearing surface
13 Shoulder
14 Bolt head
15 Seal sleeve
16 Bearing element
20 Torque sensor
21, 21' Elongation sensor/Pre-tension sensor
22 Identification sensor
23 Tag
30 Output device
40 Trend
51 Head
52 Shank
53 Thread
54 Transition
55 Transition
56 Thread root
57 Interface
d1 Largest diameter
d2 Smallest diameter
d3 Stress-carrying area
Q Sharp transition
t Time
x Performance indicator parameter
xm, xn Thresholds
Z Circular cut in root

What is claimed is:

1. A torque tool configured for making up and breaking out joints in a riser, the torque tool comprising:
   a tool body;
   a tool head having a socket which is configured to receive a head of a bolt and to apply a torque on the bolt;
   a torque sensor operable to measure the torque applied on the bolt;
   a pre-tension sensor operable to measure a pre-tension in a longitudinal extension of the bolt when the bolt is received in the tool head;
   an identification sensor; and
   a tag arranged on or in the bolt,
   wherein,
   the identification sensor is operable to establish a unique identity of the tag arranged on or in the bolt.

2. The torque tool as recited in claim 1, wherein the pre-tension sensor is,
   arranged in the socket and is configured to engage the head of the bolt, or
   configured to be temporarily arranged on a tail end of the bolt.

3. The torque tool as recited in claim 1, wherein the pre-tension sensor is an elongation sensor.

4. The torque tool as recited in claim 1, wherein,
   the pre-tension sensor comprises an acoustic transducer, and
   the pre-tension sensor is operable to receive an acoustic reflection time in the bolt.

5. The torque tool as recited in claim 1, wherein the identification sensor is arranged in the socket.

6. The torque tool as recited in claim 1, wherein,
the identification sensor is provided as an RFID reader, the tag arranged on or in the bolt is provided as an RFID tag, and the RFID reader is operable to identify the RFID tag, and
the pre-tension sensor comprises a microprocessor and a stored database of bolt characteristics, the pre-tension sensor being further operable to determine a bolt identity via the microprocessor and the stored database of bolt characteristics, or
the identification sensor is provided as a visual sensor, the tag arranged on or in the bolt is provided as a visual tag which is arranged on the bolt, and the visual sensor is operable to identify the visual tag arranged on the bolt, and
the pre-tension sensor comprises a microprocessor and a stored database of bolt characteristics, the pre-tension sensor being further operable to determine a bolt identity via the microprocessor and the stored database of bolt characteristics.

7. The torque tool as recited in claim 1, further comprising:
a computing system configured to receive measurements from the torque sensor and the pre-tension sensor.

8. The torque tool as recited in claim 7, further comprising:
an output device operatively connected to the computing system, the computing system being configured to,
process the measurements,
compare a processed value of the measurements to one or more pre-defined ranges, and
output a signal to an operator of the torque tool if the processed value lies within the pre-defined ranges and/or if the processed value lies outside the pre-defined ranges.

9. The torque tool as recited in claim 8, wherein the pre-defined ranges comprise a torque range which is indicative of a desired make-up torque for the bolt and a bolt pre-tension range which is indicative of a desired make-up pre-tension for the bolt.

10. The torque tool as recited in claim 1, further comprising:
a computing system which is configured to receive measurements from the torque sensor and the pre-tension sensor,
wherein,
the computing system is operable to, for a plurality of make-up operations,
receive the unique identity of the tag identifying the bolt,
calculate a performance indicator parameter, the performance indicator parameter being a function of a measured make-up torque and a measured pre-tension of the bolt, and
output the performance indicator parameter to an operator.

11. The torque tool as recited in claim 10, wherein the computing system is further operable to output a trend of the performance indicator parameter.

12. A method for pre-tensioning bolted riser joints comprising a plurality of bolts, the method comprising:
operating the torque tool as recited in claim 1 to engage a head of a bolt;
operating the torque tool to apply a make-up torque to the bolt while measuring the torque applied with the torque sensor and the pre-tension of the bolt with the pre-tension sensor; and
continuing to apply torque with the torque tool until the measured torque lies within a pre-determined range of prescribed torque values and the pre-tension lies within a pre- determined range of prescribed pre-tension values.

13. The method as recited in claim 12, further comprising:
outputting a signal to an operator of the torque tool if the measured torque lies within the pre-determined range of prescribed torque values and the pre-tension lies within the pre- determined range of prescribed pre-tension values.

14. The method as recited in claim 12, further comprising:
logging the measured torque and the measured pre-tension in a computing system.

15. A method of managing a plurality of bolts for riser joints, the method comprising:
(a) operating a torque tool comprising,
a tool body,
a tool head having a socket which is configured to receive a head of a bolt and to apply a torque on the bolt, the bolt being one of the plurality of bolts,
a torque sensor operable to measure the torque applied on the bolt,
a pre-tension sensor operable to measure a pre-tension in a longitudinal extension of the bolt when the bolt is received in the tool head,
an identification sensor, and
a tag arranged on or in the bolt,
wherein the identification sensor is operable to establish a unique identity of the tag arranged on or in the bolt,
to fasten each of the plurality of bolts while measuring a torque applied on the bolt and a resulting pre-tension of the bolt;
(b) calculating a performance indicator parameter, the performance indicator parameter being a function of the measured torque and the measured resulting pre-tension of the bolt and indicative of a coefficient of friction between the bolt and the riser;
(c) comparing the performance indicator parameter to one or more pre-defined ranges; and
(d) replacing the bolt if the performance indicator parameter lies outside the one or more pre-defined ranges.

16. The method as recited in claim 15, comprising:
repeating steps (a) to (c) for a plurality of riser joint make-up operations; and
logging values of the performance indicator parameter for the plurality of make-up operations.

17. The method as recited in claim 15, further comprising:
operating the torque tool to receive a unique identity of a bolt; and
outputting a trend of the performance indicator parameter for the bolt having the unique identity over the plurality of make-up operations.

18. A method of managing a plurality of bolts for riser joints, the method comprising:
during deployment of a riser, operating a torque tool comprising,
a tool body,
a tool head having a socket which is configured to receive a head of a bolt and to apply a torque on the bolt, the bolt being one of the plurality of bolts,
a torque sensor operable to measure the torque applied on the bolt, and
a pre-tension sensor operable to measure a pre-tension in a longitudinal extension of the bolt when the bolt is received in the tool head, to:

identify the bolt;
apply a make-up torque to the bolt;
measure a first pre-tension value for the bolt with the pre-tension sensor; and
store the measured pre-tension in a database; and during retrieval of the riser:
identify the bolt;
measure a second pre-tension value for the bolt with the pre-tension sensor; and
output a performance indicator value to an operator, the performance indicator value comprising the first pre-tension value and second pre-tension value and/or a comparison between the first pre-tension value and second pre-tension value.

19. The method as recited in claim 18, further comprising:
measuring the make-up torque with the torque sensor; and
storing the measured make-up torque in the database,
wherein the performance indicator value further comprises the measured make-up torque or a function of the measured make-up torque.

20. The method as recited in claim 19, further comprising:
applying a break-out torque to the bolt; and
measuring the break-out torque with the torque sensor,
wherein the performance indicator value further comprises the measured break-out torque or a function of the measured break-out torque.

* * * * *